Figure 1:
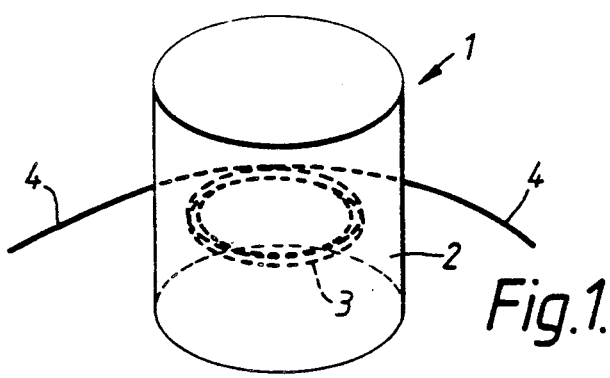

United States Patent [19]
Curtis

[11] Patent Number: 5,095,514
[45] Date of Patent: Mar. 10, 1992

[54] FIBRE OPTIC SENSOR

[75] Inventor: Alan C. Curtis, Somerset, Great Britain

[73] Assignee: Plessey Overseas Limited, Ilford, England

[21] Appl. No.: 394,106

[22] Filed: Aug. 14, 1989

[30] Foreign Application Priority Data

Aug. 16, 1988 [GB] United Kingdom ............... 8819469

[51] Int. Cl.$^5$ ............................................. G02B 6/16
[52] U.S. Cl. ....................................... 385/12; 385/123
[58] Field of Search ............... 350/96.13, 96.14, 96.15, 350/96.29, 96.3, 96.34

[56] References Cited

U.S. PATENT DOCUMENTS

| 4,235,113 | 11/1980 | Carome | 350/96.29 X |
| 4,729,620 | 3/1988 | Pavlath | 350/96.15 |
| 4,750,796 | 6/1988 | Shibata et al. | 350/96.29 |
| 4,840,452 | 6/1989 | Federmann et al. | 350/96.29 |
| 4,886,333 | 12/1989 | Hicks | 350/96.15 |

FOREIGN PATENT DOCUMENTS 2166020 4/1986 United Kingdom .

Primary Examiner—John D. Lee
Assistant Examiner—John Ngo
Attorney, Agent, or Firm—Fleit, Jacobson, Cohn, Price, Holman & Stern

[57] ABSTRACT

A fibre optic sensor 1 comprises a body 2 of a matrix material which includes an embedded length of optical fibre 3. When the body 2 is exposed to an external disturbance, mechanical and strain forces arising internally can be transmitted to the fibre 3 and will modify the passage of light therein. Pulsed light through the fibre 3 can be sensed for example by interferometry to measure the disturbance. This can provide an inexpensive and sensitive sensor construction which is capable of the remote detection of various parameters.

13 Claims, 3 Drawing Sheets

FIBRE OPTIC SENSOR

This invention relates to a fibre optic sensor and an associated optical sensor system for the remote detection or measurement of various parameters.

In the field of sensing and detection, optical fibres may be used to provide data transmission with advantages in noise immunity, capability of large transmission distance from the measuring point, and so on. One such sensing system has been disclosed in patent application number GB 2166020.

The advantages in use of such a system would be increased if the sensing operation could be performed without a need to provide an electrical supply to the sensor head. One known type of fibreoptic electric field sensor generally utilises extrinsic (that is, out-of-fibre) sensing means, in which light from a fibre is directed through an electro-optic crystal, such as one of lithium niobate, which has been appropriately cut and mounted. The light then becomes phase modulated by the action of the electric field on the crystal, and the emerging light is collected and directed back into the same or another optical fibre for return and detection of the modulation by conventional interferometric means. Such sensors generally have a low sensitivity owing to the difficulty of fabricating suitably large electro-optic crystals. The present invention was devised in an attempt to provide means for increasing the working sensitivity of the sensor head.

According to the invention, there is provided a fibre optic sensor comprising a body of a matrix material which includes an embedded length of optical fibre, the body being arranged such that when it is exposed to an external disturbance a transduction effect will cause corresponding mechanical stresses and strains to be developed internally and be applied to said fibre, the resulting stresses and strains in the fibre causing a modification of the light transmission behaviour thereof which can be detected in the passage of light through said fibre length.

In one embodiment, the fibre is arranged in the form of a winding such as coil within the body of said matrix material. The winding may be of sinuous, spherical, cylindrical, arcuate, planar, or zig-zag configuration and may have multiple tight bends along its length. Alternatively, the fibre may be arranged longitudinally within an elongated body of the matrix material. The matrix material may be composed of two or more phases. In a further embodiment, the matrix material has isotropic properties.

The detection of an output signal from the sensor may be effected by standard optical means such as by an interferometric, amplitude sensing or polarimetric technique.

Figure 2:
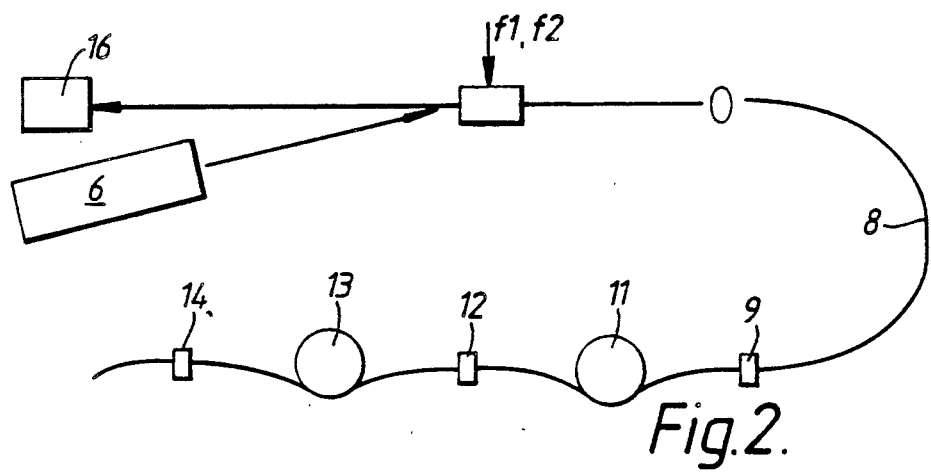
Figure 3:
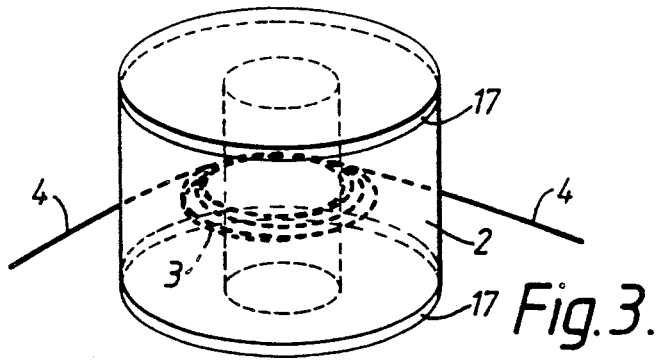
Figure 4:
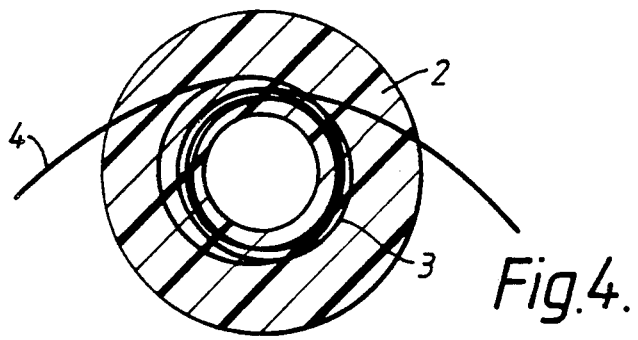
Figure 5:
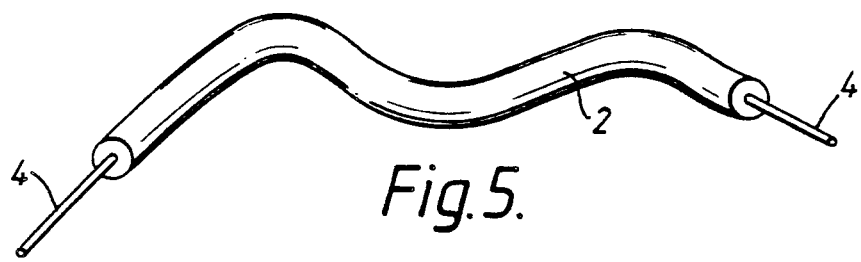
Figure 6:
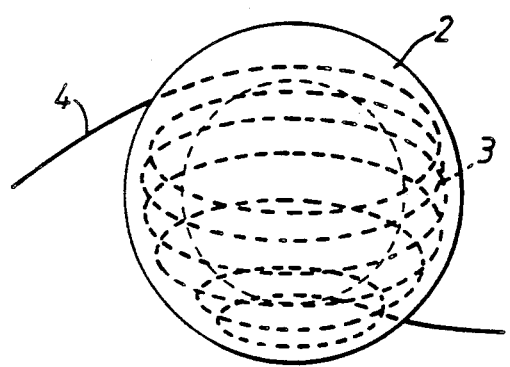
Figure 7:
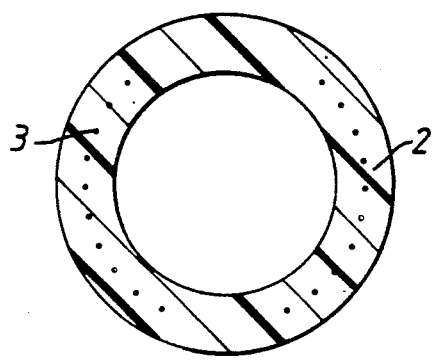
Figure 12:
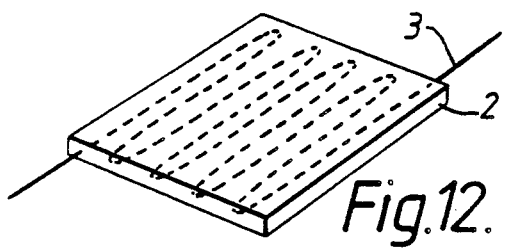
Figure 14:
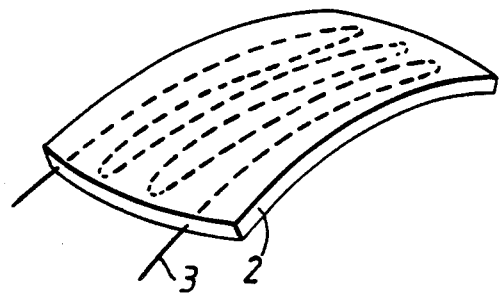
Figure 13:
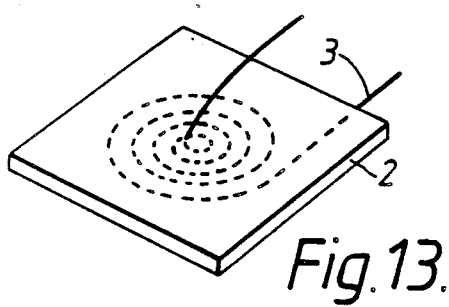
Figure 15:
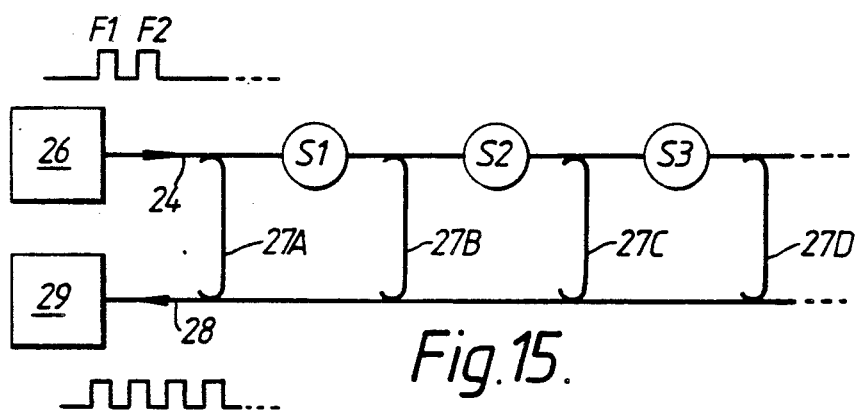
Figure 16:
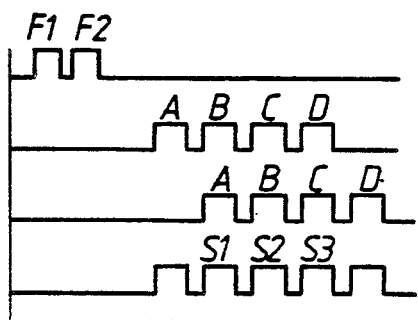
Figure 17:
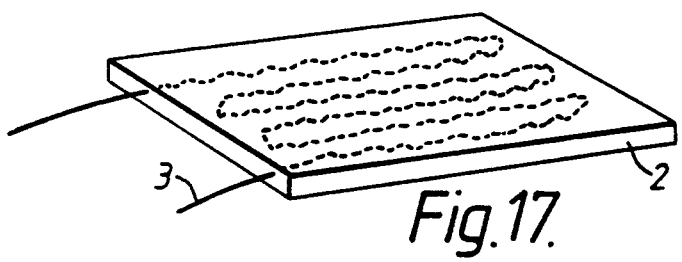

By way of example, some particular embodiments of the invention will now be described with reference to the accompanying drawings, in which:

FIG. 1 is a view of a cylindrical body of matrix material carrying an embedded length of optical fibre, FIG. 2 shows an optical sensing apparatus making use of a reflectometric system, FIG. 3 shows one embodiment of an optical fibre magnetic field sensor, FIG. 4 is a cross-sectional view of the embodiment of FIG. 3, FIG. 5 shows a long optical fibre which is encapsulated longitudinally within an elongated body of the matrix material, FIGS. 6 and 7 show a further embodiment in which a fibre coil is embedded within the wall of a hollow sphere of the matrix material, FIGS. 8 to 11 show electric field, voltage and current sensors, FIGS. 12 to 14 show arrangements where the fibre is laid in a thin plate of the matrix material, FIG. 15 shows a two-fibre pulsed interferometric sensor system, FIG. 16 is a graph depicting samples of transmitted and return light pulses as they occur in the system of FIG. 15, and, FIG. 17 shows a construction of cumulative sensor element where a fibre having microbend portions located along its length is incorporated in a thin plate of matrix material.

As shown in FIG. 1, the fibre optic sensor 1 comprises a body 2 of a matrix material which in this example has piezoelectric properties and is formed of particles of lead titanate ceramic which are dispersed in a polyurethane matrix. Embedded within the body 2 is a coil of optical fibre 3 which terminates in two external connecting leads 4. When the completed device is placed in a varying electric field, the piezoelectric character of the body material will cause deformation of the material and this will create stresses and strains which will be transmitted to a wall of the optical fibre 3.

In operation, the connecting leads 4 will be connected at an input side to a source of light and at an output side to a detector capable of detecting any change in the output light. Upon passing through the strained optical fibre 3, the input light will experience a phase or amplitude change at the detector output and the magnitude of this change will be representative of the electric field strength. The resulting detector output is therefore able to provide a remote indication of the electric field strength and this is done without needing any separate electrical supply to be provided for the sensor element.

This can allow the fibre optic sensor to be situated in an unpleasant environment such as high humidity, high temperature or in the presence of an inflammable gas which would normally have an undesirable effect on the working of an electrically-operated sensor. The fibre optic sensor is thus able to function successfully in places such as coal mines, oil refineries or aircraft bodies where the elimination of even a small fire risk would be welcomed.

One system for detecting an output signal from the sensor is depicted in FIG. 2. This Figure shows a laser light source 6 which is arranged for directing pulses of light into a Bragg cell 7. The Bragg cell 7 divides the incoming light into portions at different frequencies $f_1$ and $f_2$ and the resulting pulses are passed into a fibre optic lead 8. The fibre optic lead 8 conducts the light pulses in sequence to a first partially reflective splice 9, a first fibre optic sensor 11, a second partially reflective splice 12, a second fibre optic sensor 13, and a third partially reflective splice 14. The first and second fibre optic sensors 11, 13 will be sensors according to the present invention which are each arranged to respond to a particular characteristic which is required to be detected or measured. A light pulse partially reflected at one of the splices 9 would be able to return down the fibre optic lead to the Bragg cell and then to be directed onto a photodiode 16.

In operation of the optical sensing apparatus, the laser produces pulses at regular intervals and these pass through the Bragg cell 7 which directs pulses at frequencies $f_1$ and $f_2$ down the fibre optic lead 8. At the first partially reflective splice 9, a small proportion of the incoming light pulses will be reflected back down the lead 8 whilst the remainder of the pulses passes through the first fibre optic sensor 11 and reaches the second partially reflective splice 12.

In passing through the first fibre optic sensor 11, the light pulses will experience a change in phase as a result of the transducing effect of the sensor and the external characteristic that the sensor has been arranged to detect.

At the second partially reflective splice 12, a further small proportion of the incoming light pulses will be reflected back down the lead 8 for detection by the photodiode 16.

The portions of the light pulses leaving the second partially reflective splice 12 continue along the fibre optic lead 8 and pass through the second fibre optic sensor 13 to reach the third partially reflective splice 14.

At the second fibre optic sensor 13, the light pulses present in the fibre optic lead 8 will experience a change in phase as a result of the transducing effect of that sensor and the external characteristic that the second sensor has been arranged to detect.

At the third partially reflective splice 14, a further small proportion of the incoming light pulses will be reflected back down the lead 8 for detection by the photodiode 16.

The signals received at the photodiode 16 are converted into electrical pulses and these determine separately for each fibre optic sensor the magnitude of the change that has been detected at each sensing position.

In a different embodiment, it would clearly be possible to have a larger number of fibre optic sensors and corresponding partially reflective splices in the arrangement coupled to the lead from the Bragg cell. This would enable the outputs from a number of sensors greater than two to be recognised and separately measured.

FIG. 3 depicts a different type of fibre optic sensor 1 which is intended to detect a change in magnetic field strength. In this embodiment, the sensor comprises a body 2 of a magnetostrictive material which is formed of divided particles of nickel dispersed in a polyurethane matrix. In an alternative embodiment, the magnetostrictive material could be particles of a 68 Permalloy material. Embedded within the body 2 is a coil of optical fibre 3 having two external connecting leads 4. In this instance, the body 2 is formed as a hollow cylinder and this is provided with sealed end caps 17. The geometry of the hollow cylinder construction is intended to increase the strain in the optical fibre 3 for a given level of stimulus as compared with that of a simple solid cylinder. In use of the magnetic field sensor, the sensor body body 2 may be placed in a steady magnetic bias field generated by suitable standard means such as a permanent magnet, in order to linearise the detected signal FIG. 4 is a cross-sectional view showing further details of the positioning of the fibre 3 in the FIG. 3 embodiment.

By making use of the present invention, a long length of fibre may be incorporated in the sensor, so that although materials suitable for forming a magnetostrictive composite may exhibit a relatively low magnetostriction effect, the overall sensitivity or gauge factor of the sensor may be high.

FIG. 5 shows an elongated body 2 of the matrix material within which is encapsulated a long optical fibre to form a long continuous sensor having connecting leads 4. The sensor may be used in this form to act as a distributed sensor capable of measuring the stimulus over a large area, alternatively, the sensor might be coiled or otherwise wound up to form a point detector.

In a further embodiment (FIGS. 6 and 7), the matrix material is arranged as a hollow spherical body 2 with an optical fibre 3 coil embedded in the wall thereof. FIG. 7 is a cross-sectional view. The geometry of this arrangement can be expected to maximise the sensitivity of the device.

Sensors which respond to various other characteristics may be devised readily. A selection of these will now be described.

A liquid level, humidity condition or a wetting sensor may be devised by encapsulating a coil of optical fibre in a hollow cylinder or other suitably shaped block of a polymer or polymer composite containing a water-sensitive phase. Examples of suitable polymers include Nylon 6 (a polyamide plastics material), Nylon 6.6, ABS (an acrylonitrile butadiene styrene copolymer), polycarbonate (PC), polyphenylsulphide (PPS), and poly(ethylene terephthalate) (PETP). On exposure to conditions of high humidity or immersion in water, these polymers will swell and tend to increase their volume thus causing the imposition of a stress and strain field on the optical fibre. The selection of the water-sensitive phase, particle sizes, concentrations and device wall thickness may be tailored to suit the device response time and the sensitivity required.

A vibration sensor can be devised which may utilise an optical fibre embedded in a composite material containing a dispersion of dense filler particles for example lead or other metallic particles in a compliant matrix such as a soft polydimethylsiloxane (a silicone rubber material). Self-inertia of the device will ensure that, when fixed to a mobile surface, the optical fibre will undergo a system of stresses and strains which may be detected by suitable optical techniques. The matrix and filler compositions and their proportions may be chosen to allow inexpensive manufacture, environmental stability such as resistance to industrial contaminants, oils etc., and a suitable resonant frequency.

A temperature sensor may be devised by embedding an optical fibre coil in a composite material which has a suitable coefficient of thermal expansion. A composite matrix material in which one or more phases comprise a gaseous bubble may be expected to have a high thermal expansion coefficient and to exhibit high sensitivity. The device response time, frequency response and sensitivity may be controlled by proper choice of the composite constituent phases.

A pyrometric sensor or other radiation detector may be devised by encapsulating an optical fibre in a composite material including a heat-absorption or light-absorption phase such as carbon black. This material could be dispersed in a transparent matrix with a suitable coefficient of thermal expansion, such as polystyrene.

A voltage sensor may be devised by the appropriate electroding of an electric field sensor as already described. Similarly, a magnetic field sensor may be configured as an electric current sensor by forming the sensor around a current-carrying conductor.

Figure 8:
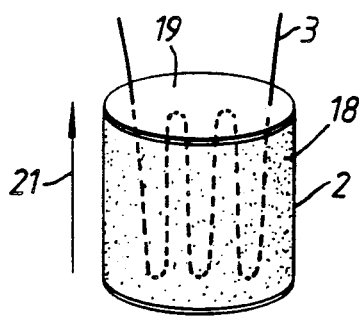

FIG. 8 shows one sensor similar to that of FIG. 1 where an optical fibre 3 is encapsulated in a body 2 of polyurethane which incorporates particles 18 of a dispersed lead titanate ceramic powder. The resulting piezoelectric properties of the matrix are made directional by polarising the device after construction. The body 2 supports a poling electrode 19 on one face and the poling direction is indicated by the arrow 21. This construction forms a direction sensitive electric field sensor.

Figure 9:
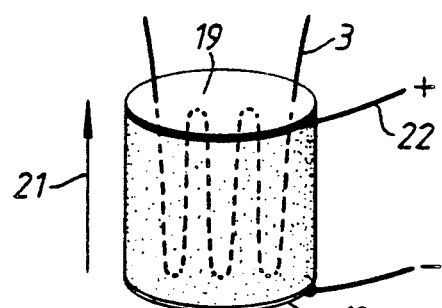

FIG. 9 shows a somewhat similar arrangement where the body 2 of similar piezoelectric material supports electrodes 19 on two opposite faces and to these electrodes electrical connection leads 22 are secured. This forms an electrical voltage sensor which is capable of detecting a potential difference between the electrodes 19.

Figure 10:
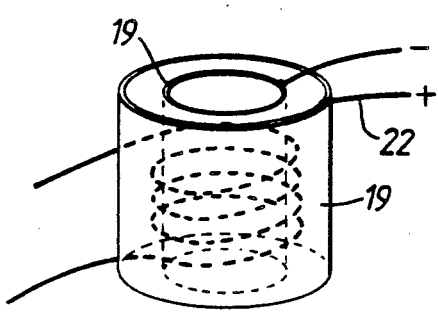
Figure 11:
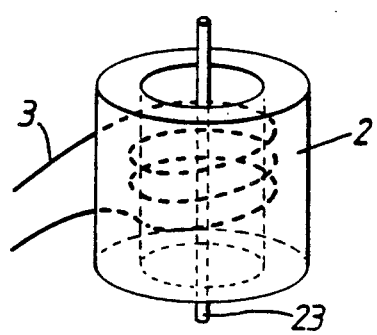

A different construction of voltage sensor is depicted in FIG. 10 where the body 2 of similar piezoelectric material is in the shape of a hollow cylinder. The inner and outer curved surfaces of the cylinder support respectively inner and outer electrodes 19 and to these electrodes the connection leads 22 are secured. In this instance, the poling of the piezoelectric material is effected in a radial direction.

A construction for an electrical current sensor is shown in FIG. 10. In this instance, the body 2 is of a composite material which exhibits magnetostrictive properties. The body is in the shape of a hollow cylinder and supported along the longitudinal axis of this cylinder is an electrical conductor 23. The body 2 as before includes the embedded optical fibre 3. This device is capable of detecting a level of electrical current flow when this is present in the conductor 23.

FIGS. 12 and 13 show alternative ways of supporting an optical fibre 3 in an encapsulating body 2. In these instances, the body 2 is in the form of a thin plate and the fibre is located in a planar zig-zag arrangement or a flat coil. FIG. 14 shows the body 2 in the form of a thin curved shell.

FIG. 15 shows a sensor output detection system which is an alternative to that of FIG. 2. This alternative construction is a two-fibre time division multiplexed interferometer which employs two fibre optic signal leads. A signal lead 24 is arranged to carry outgoing optical light pulses from a laser light source 26. The light source 26 is capable of producing a first light pulse at a frequency of F1 and closely following this with a second pulse of frequency F2. The said lead 24 conducts the pulses to a series of fibre optic sensors S1, S2, S3, etc. Before each of the sensors, the system includes a directional fibre coupler 27A, B, C, D etc., and these couplers serve to return a portion of each outgoing pulse to a return fibre optic lead 28. The output from the return lead 28 is applied to an optical detector 29 which in this embodiment is a photodiode.

The operation of this system will be described in conjunction with the graph of FIG. 16. This graph shows the presence of pulses which occur at different points in the system of FIG. 15 where the horizontal axis represents elapsed time.

The first horizontal line of the graph shows the two pulses of frequencies F1 and F2 as they are transmitted by the light source 26. The second line of the graph shows the pulses of frequency F1 which have travelled from the first lead 24 via the fibre couplers 27A, B, C, D etc to the return optic lead 28. The distance travelled by these pulse causes a time difference to be experienced as compared with the times of the pulses F1 and F2.

The third line of the graph similarly shows the pulses of frequency F2 as they are received on the return optic lead 28. The fourth line of the graph gives the output of the optical detector 29 after it has deducted a return pulse of frequency F2 from the coincident return pulse of frequency F1. The result is a series of pulses on the fourth line the values of which give the outputs of each of the sensors S1, S2, S3 etc. in sequence.

A further type of fibre optic sensor is shown in FIG. 17. This has a length of optical fibre 3 which is provided with a large number of tight bends along its length and which is encapsulated in a body 2 such that the bends are held in a tightly folded condition. The body 2 is formed of a polymer material which is permeable to water and which includes, for example, dispersed particles carrying a water soluble coating. When the resulting sensor is partially immersed in water, the material of the coating will tend to be leached out and this will permit the bends in the fibre to relax thus causing a reduction in the microbending losses and hence an increase in the transmitted light. Since this type of change is non-reversible, the sensor will indicate a cumulative value rather than an absolute value.

Other types of sensor can be devised where a chemical or physical-chemical change will cause a stress and strain difference which will be applied to the optical fibre. These include changes in oxidation, acidity/alkalinity, surface adsorption, osmotic pressure, temperature.

Further sensor types may be constructed as required, by encapsulating an optical fibre in an appropriate matrix material. For example, a chemical-species-specific detector may be made by incorporating an appropriate biological polymer into a suitable matrix.

The fibre optic sensor of the invention has been found to have particular advantages in that it is an intrinsic sensor where the light signal intended to be modified does not need to be passed out of the optical fibre. This characteristic can thus give the sensor the additional advantages of a low sensitivity to extraneous thermal and/or vibrational effects.

The foregoing description of embodiments of the invention has been given by way of example only and a number of modifications may be made without departing from the scope of the invention as defined in the appended claims. For instance, it is not essential to use the reflectometric detection system that has been specifically described. Alternative detection systems could be devised that would use, for example, the Mach-Zehnder fibre-optic interferometer or a polarimeter.

The sensor matrix material may be homogeneous or inhomogeneous, an isotropic or anisotropic dispersion of elements of one or more materials within a matrix of another material. The class of the composite material and the constituent phases is such as to provide a primary transduction from the disturbance to be measured to a mechanical strain which is impressed on the optical fibre.

The above examples and attached drawings are illustrative of the appropriate techniques, and it will clear that some of the realisations shown in the drawings are applicable to other types of sensor outlined but not shown in that form. In addition, those skilled in the art will be able to devise other suitable realisations based on the principles outlined herein.

I claim:

1. A fibre optic sensor comprising a body of a matrix material which includes an embedded length of optical fibre, the body being arranged such that when it is exposed to an external disturbance a transduction effect will cause corresponding mechanical stresses and strains to be developed internally in the matrix material, said strains being applied to said fibre, the resulting stresses and strains in the fibre causing a modification of the light transmission behavior thereof which can be detected in the passage of light through said fibre length, the fibre being arranged in the form of a winding within the body of said matrix material.

2. A optical sensor system comprising a fibre optic sensor as claimed in claim 1.

3. A sensor as claimed in claim 1, wherein the winding is a coil.

4. A sensor as claimed in claim 1, wherein the winding is of sinuous configuration.

5. A sensor as claimed in claim 1, wherein the winding if of spherical configuration.

6. A sensor as claimed in claim 1, wherein the winding is of cylindrical configuration.

7. A sensor as claimed in claim 1, wherein the winding is of arcuate configuration.

8. A sensor as claimed in claim 1, wherein the winding is of planar configuration.

9. A sensor as claimed in claim 1, wherein the winding has multiple type bends along its length.

10. A sensor as claimed in claim 1, wherein the winding is of zig-zag configuration.

11. A fibre optic sensor comprising a body of a matrix material which includes an embedded length of optical fibre, the body being arranged such that when it is exposed to an external disturbance a transduction effect will cause corresponding mechanical stresses and strains to be developed internally in the matrix material, said strains being applied to said fibre, the resulting stresses and strains in the fibre causing a modification of the light transmission behavior thereof which can be detected in the passage of light through said fibre length and in which the matrix material is composed of two or more phases.

12. A fibre optic sensor comprising a body of a matrix material which includes an embedded length of optical fibre, the body being arranged such that when it is exposed to an external disturbance a transduction effect will cause corresponding mechanical stresses and strains to be developed internally in the matrix material, said strains being applied to said fibre, the resulting stresses and strains in the fibre causing a modification of the light transmission behavior thereof which can be detected in the passage of light through said fibre length and in which the matrix material has isotropic properties.

13. A fibre optic sensor comprising a body of a matrix material which includes an embedded length of optical fibre, the body being arranged such that when it is exposed to an external disturbance a transduction effect will cause corresponding mechanical stresses and strains to be developed internally in the matrix material, said strains being applied to said fibre, the resulting stresses and strains in the fibre causing a modification of the light transmission behavior thereof which can be detected in the passage of light through said fibre length and in which the matrix material comprises one continuous phase with another dispersed phase.

* * * * *